(12) United States Patent
Smerczak et al.

(10) Patent No.: US 12,560,236 B2
(45) Date of Patent: Feb. 24, 2026

(54) BEARING SPACER

(71) Applicant: BorgWarner Inc., Auburn Hills, MI (US)

(72) Inventors: John R. Smerczak, Ortonville, MI (US); Anthony Mattord, Macomb Township, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 18/748,369

(22) Filed: Jun. 20, 2024

(65) Prior Publication Data

US 2025/0389330 A1 Dec. 25, 2025

(51) Int. Cl.
F16J 15/02 (2006.01)
F16C 33/78 (2006.01)

(52) U.S. Cl.
CPC ......... F16J 15/025 (2013.01); *F16C 33/7886* (2013.01)

(58) Field of Classification Search
CPC ........ F16J 15/022; F16J 15/024; F16J 15/025; F16C 33/768; F16C 33/7886
See application file for complete search history.

(56) References Cited

U.S. PATENT DOCUMENTS

| | | | |
|---|---|---|---|
| 2,818,283 | A | 12/1957 | Hutterer |
| 3,228,705 | A * | 1/1966 | Underwood ............. F16J 15/32 |
| | | | 277/587 |

| | | | |
|---|---|---|---|
| 3,521,607 | A | 7/1970 | Wiseman et al. |
| 4,013,373 | A * | 3/1977 | Lamprecht .............. F16C 33/60 |
| | | | 277/609 |
| 4,193,606 | A * | 3/1980 | Iverson ................ F16J 15/3208 |
| | | | 277/556 |
| 4,242,066 | A | 12/1980 | Hodgson |
| 4,476,602 | A | 10/1984 | Hurn et al. |
| 4,495,856 | A | 1/1985 | Sollami |
| 4,692,040 | A * | 9/1987 | Ebaugh ................... B21B 31/07 |
| | | | 384/477 |
| 4,780,953 | A | 11/1988 | Wheeler et al. |

(Continued)

FOREIGN PATENT DOCUMENTS

| | | |
|---|---|---|
| AU | 2537792 A | 4/1993 |
| CN | 201651192 U | 11/2010 |

(Continued)

OTHER PUBLICATIONS

Zhongde; Die Rubber Spacer / EPDM Rubber Support Ring / Neoprene Bearing Spacer; zdcpucn.en.made-in-china.com; Accessed: Feb. 22, 2024; (8 pages).

(Continued)

*Primary Examiner* — Nicholas L Foster
(74) *Attorney, Agent, or Firm* — Reising Ethington P.C.

(57) ABSTRACT

A spacer is configured to abut an output shaft bearing. The spacer has an inner diameter and an outer diameter. A first wall extends from the inner diameter to the outer diameter, and is configured to abut a radial surface of the output shaft bearing as well as a surface of a housing. A second wall, attached to the first wall at the inner diameter, extends from the inner diameter to the outer diameter, and is configured to abut a surface of the housing. The first wall and the second wall are axially spaced apart at the outer diameter.

11 Claims, 5 Drawing Sheets

(56) References Cited

U.S. PATENT DOCUMENTS

| | | | |
|---|---|---|---|
| 5,199,718 A | 4/1993 | Niemiec | |
| 5,245,741 A | 9/1993 | Smith et al. | |
| 6,062,734 A * | 5/2000 | Bundgart | F16C 33/7853 |
| | | | 384/477 |
| 6,073,933 A | 6/2000 | Johnston | |
| 6,227,547 B1 | 5/2001 | Dietle et al. | |
| 6,530,355 B2 | 3/2003 | Ito et al. | |
| 6,880,638 B2 | 4/2005 | Haughom et al. | |
| 7,021,632 B2 | 4/2006 | Grace | |
| 7,901,140 B2 * | 3/2011 | Petri | F16J 15/3456 |
| | | | 384/147 |
| 8,075,196 B2 * | 12/2011 | Burner | F03D 80/70 |
| | | | 384/558 |
| 8,803,390 B2 | 8/2014 | Uchida et al. | |
| 11,131,384 B2 | 9/2021 | Jordan et al. | |
| 2009/0190874 A1 * | 7/2009 | Burner | F03D 80/70 |
| | | | 384/480 |
| 2015/0267816 A1 | 9/2015 | Boskovski | |
| 2015/0354704 A1 * | 12/2015 | Epshetsky | F16J 15/3208 |
| | | | 277/549 |
| 2015/0377357 A1 * | 12/2015 | Epshetsky | F16J 15/3268 |
| | | | 277/402 |

FOREIGN PATENT DOCUMENTS

| | | |
|---|---|---|
| CN | 204304686 U | 4/2015 |
| CN | 108425819 A | 8/2018 |
| CN | 212875554 U | 4/2021 |
| DE | 2533263 A1 | 1/1977 |
| WO | WO2020170417 A1 | 8/2020 |

OTHER PUBLICATIONS

Parker; Radial Shaft Seals (Prädifa) | Product Series; https://ph.parker.com/us/en/product-list/radial-shaft-seals; Accessed: Feb. 22, 2024; (3 pages).

Parker; Rotary Shaft Seals; https://ph.parker.com/us/en/series/rotary-shaft-seals; Accessed: Feb. 22, 2024; (4 pages).

* cited by examiner

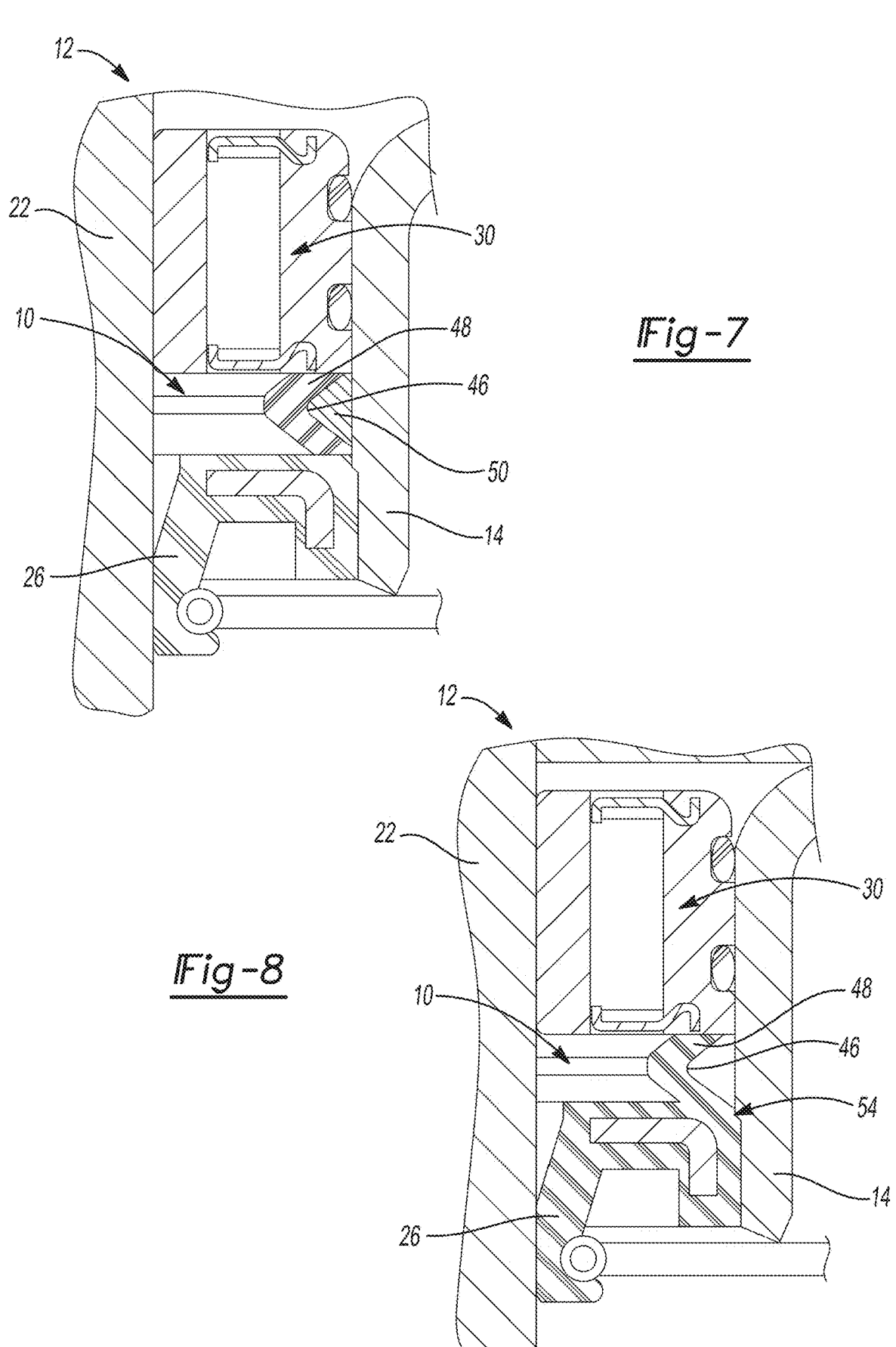
_Fig-7_
_Fig-8_

BEARING SPACER

TECHNICAL FIELD

The present application relates to a spacer to be used in rotating electrical machines.

BACKGROUND

Rotating electrical machines experience vibrations from movement of components of the rotating electrical machine or the environment of the rotating electrical machine that can disturb output shaft bearings. By supporting the output shaft bearings and dampening any vibrations, the reliability of the rotating electrical machine can be improved.

SUMMARY

In one implementation, a spacer configured to be received by an output shaft and abut an output shaft bearing. The spacer having an inner diameter, configured to receive the output shaft, and an outer diameter. A first wall extends from the inner diameter to the outer diameter, and is configured to abut a radial surface of the output shaft bearing as well as a surface of a housing. A second wall, attached to the first wall at the inner diameter, extends from the inner diameter to the outer diameter, and is configured to abut a surface of the housing. The first wall and the second wall are axially spaced apart at the outer diameter.

In another implementation, the spacer is configured to be received by an output shaft and abut an output shaft bearing. The spacer comprises an inner diameter, configured to receive the output shaft coupled to a rotating electrical machine, and an outer diameter. A first wall extends from the inner diameter to the outer diameter and is configured to abut a radial surface of the output shaft bearing as well as a surface of a housing that encloses the rotating electrical machine. A second wall, attached to the first wall at the inner diameter, extends from the inner diameter to the outer diameter, and is configured to abut a surface of the housing. The first wall and the second wall are axially spaced apart at the outer diameter.

In another implementation, a spacer configured to be received by an output shaft and abut an output shaft bearing. The spacer having an inner diameter, configured to receive the output shaft, and an outer diameter. A first wall extends from the inner diameter to the outer diameter, and is configured to abut a radial surface of the output shaft bearing as well as a surface of a housing. A second wall, attached to the first wall at the inner diameter, extends from the inner diameter to the outer diameter, and is configured to abut an output shaft seal. The first wall and the second wall are axially spaced apart at the outer diameter.

BRIEF DESCRIPTION OF THE DRAWINGS

FIG. 7 is a cross-sectional view depicting a portion of the rotating electrical machine having another implementation of a spacer configured to be received by an output shaft and abut an output shaft bearing;

FIG. 8 is a cross-sectional view depicting a portion of the rotating electrical machine having yet another implementation of a spacer configured to be received by an output shaft and abut an output shaft bearing, wherein the spacer and an output shaft seal are integrated as one component.

DETAILED DESCRIPTION

A spacer may be used with rotating electrical machines to dampen vibrations while holding an output shaft bearing in place. In some implementations, the spacer is composed of a durable elastomer material having a V-shaped cross-section helping resist high vibration environments. The spacer has an inner diameter and an outer diameter. A first wall extends from the inner diameter to an outer diameter and is configured to abut a radial surface of the output shaft bearing. A second wall is axially spaced from the first wall and is configured to abut a housing that encapsulates the spacer and the output shaft bearing such that the spacer is axially compressible to load the output shaft bearing. The spacer may have a groove extending circumferentially around the spacer from the outer diameter between the first wall and the second wall. The shape and size of the groove may be altered to tune the dampening and stiffness of the spacer based on the needs of the intended implementation.

In the past, rotating electrical machines have relied on metallic wave springs to dampen vibrations that are transmitted from the housing of the rotating machine to an output shaft bearing of the rotating machine. However, metallic wave springs are susceptible to failure when exposed to significant vibrations. When used in rotating machines, a failed metallic wave spring may fracture into pieces, potentially mechanically binding the rotating machine. Therefore, an elastomer spacer having a V-shaped cross-section, as disclosed herein, has greater vibrational dampening properties than a metallic wave spring and can provide an axial force on the output shaft bearing while increasing the longevity of the rotational machine and reducing the potential for mechanical binding leading to catastrophic failure of the rotating electrical machine.

Figure 1:
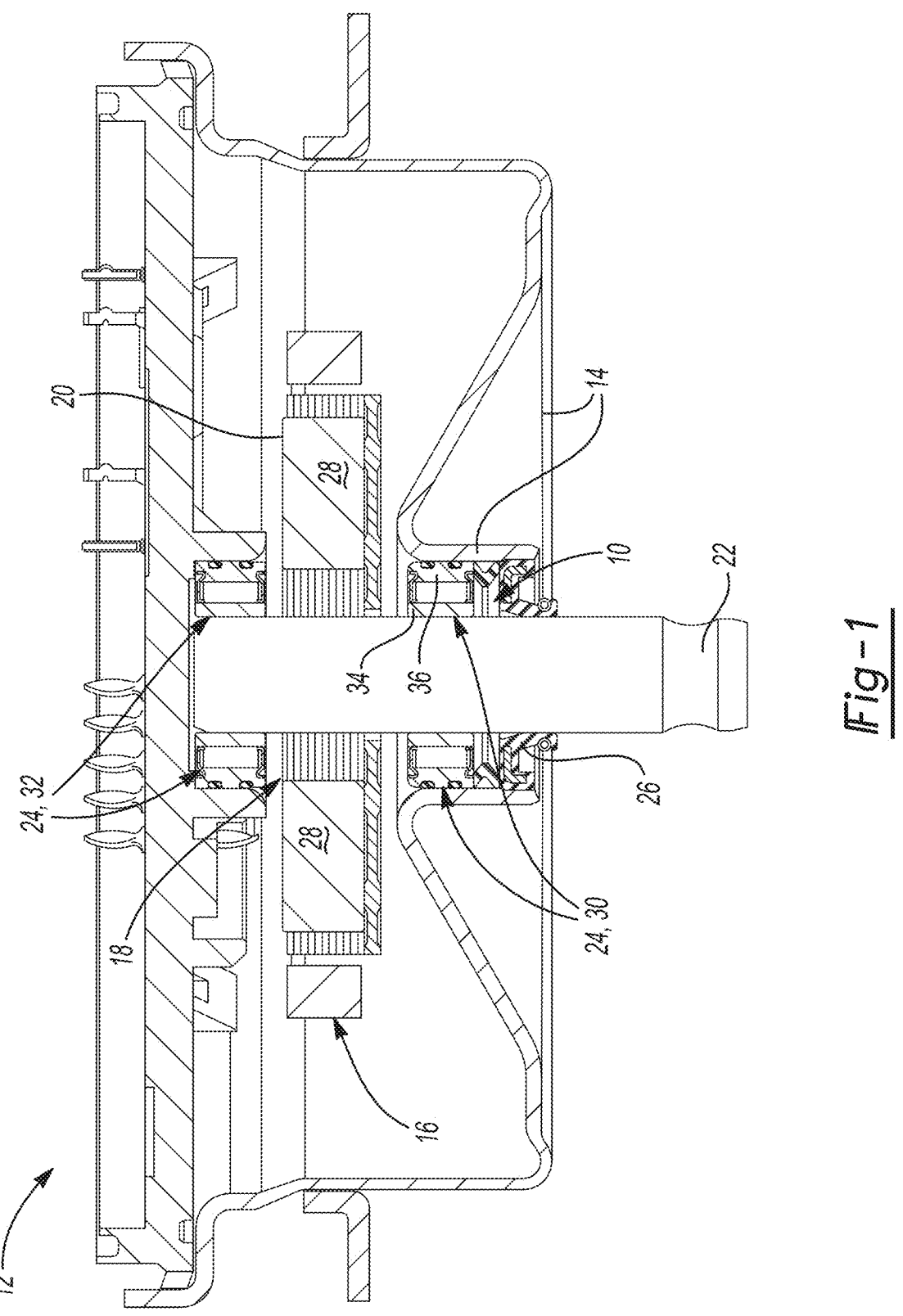
FIG. 1 is a cross-sectional view depicting an implementation of a rotating electrical machine having a spacer configured to be received by an output shaft and abut an output shaft bearing.

FIG. 1 shows an implementation of a spacer 10 used with a rotating electrical machine 12. The rotating electrical machine 12 includes a housing 14, a stator assembly 16, and a rotor assembly 18. The housing 14 is a structural component configured to support components of the rotating electrical machine 12. The housing 14 may be made of a structurally strong material, such as metal, and may encapsulate components of the stator assembly 16 and the rotor assembly 18, preventing outside contaminants from entering the rotating electrical machine 12. The housing 14 may be adapted to include or receive fasteners such as, but not limited to, bolts, screws, studs, lugs, clips, pins, brackets and/or other fasteners in order to couple to other machines or assemblies.

The stator assembly 16 is located within and supported by the housing 14. The stator assembly 16 can include laminations that are stacked axially together and bonded to form the shape of the stator, including stator slots. The stator can receive stator windings within the stator slots that are connected to an electrical power source. By selectively controlling the flow of electrical current through the stator windings, a rotating electro magnetic field can be induced in an area near the stator assembly inducing the angular movement of the rotor assembly 18 relative to the stator assembly 16.

The rotor assembly 18 is supported by the housing 14 and at least partially surrounded by the stator assembly 16. The implementation shown in FIG. 1 depicts a rotor assembly 18 including a rotor 20, an output shaft 22, one or more output shaft bearings 24, a spacer 10, and an output shaft seal 26. The rotor 20 of FIG. 1 can be formed from a number of stacked laminated sheets of iron bonded together and has slots angularly spaced about the rotor 20 constraining permanent magnets 28 configured to interact with the electromagnetic force emitted by the stator assembly 16. The permanent magnets 28 are located between an inner rotor diameter and an outer rotor diameter. The output shaft 22 can be press-fit into the inner rotor diameter to prevent the angular displacement of the output shaft 22 relative to the rotor 20. In some implementations, the output shaft 22 may be configured to interact with other machines, components, and/or assemblies such that a portion of the can protrude out of the housing 14.

Output shaft bearings 24 can be received within the housing 14 and support the output shaft 22. In the implementation shown in FIG. 1, a first output shaft bearing 30 and a second output shaft bearing 32 can receive the output shaft 22 on opposite sides of the rotor 20 such that the second output shaft bearing 32 abuts the housing 14 on both radial surfaces of the second output shaft bearing 32. The first output shaft bearing 30 abuts the housing 14 on one radial surface and abuts the spacer 10 on the other radial surface. The term "radial" as it is used here refers to a surface that extends radially outwardly from an axis of shaft rotation. The term "axial" is used to refer an element that extends axially along the axis of shaft rotation. The first output shaft bearing 30 and the second output shaft bearing 32 both include an inner bearing portion 34 and an outer bearing portion 36 wherein the inner bearing portion 34 circumferentially surrounds at least a portion of the output shaft 22. An outer bearing portion 36 can be constrained by the housing 14 and surrounds the inner bearing portion 34, allowing the inner bearing portion 34 to rotate freely relative to the outer bearing portion 36. Any bearing type capable of handling the loads experienced by the rotating electrical machine 12 may be used. For example, a plurality of balls may be positioned radially between the inner bearing portion 34 and the outer bearing portion 36 and/or a lubricant may fill the space between the inner bearing portion 34 and the outer bearing portion 36, providing minimized friction with respect to rotation of the inner bearing portion 34 constrained about the axis of the output shaft 22. An output shaft seal 26 can be positioned between the spacer 10, the housing 14, and the output shaft 22 to prevent contaminants from entering the housing 14 and lubricants from exiting the housing 14 along the output shaft 22. The output shaft seal 26 may be of a flexible elastomer material to conform to output shaft 22 despite any vibrations experience by the output shaft 22 when in operation.

Figures 2, 3, 4:
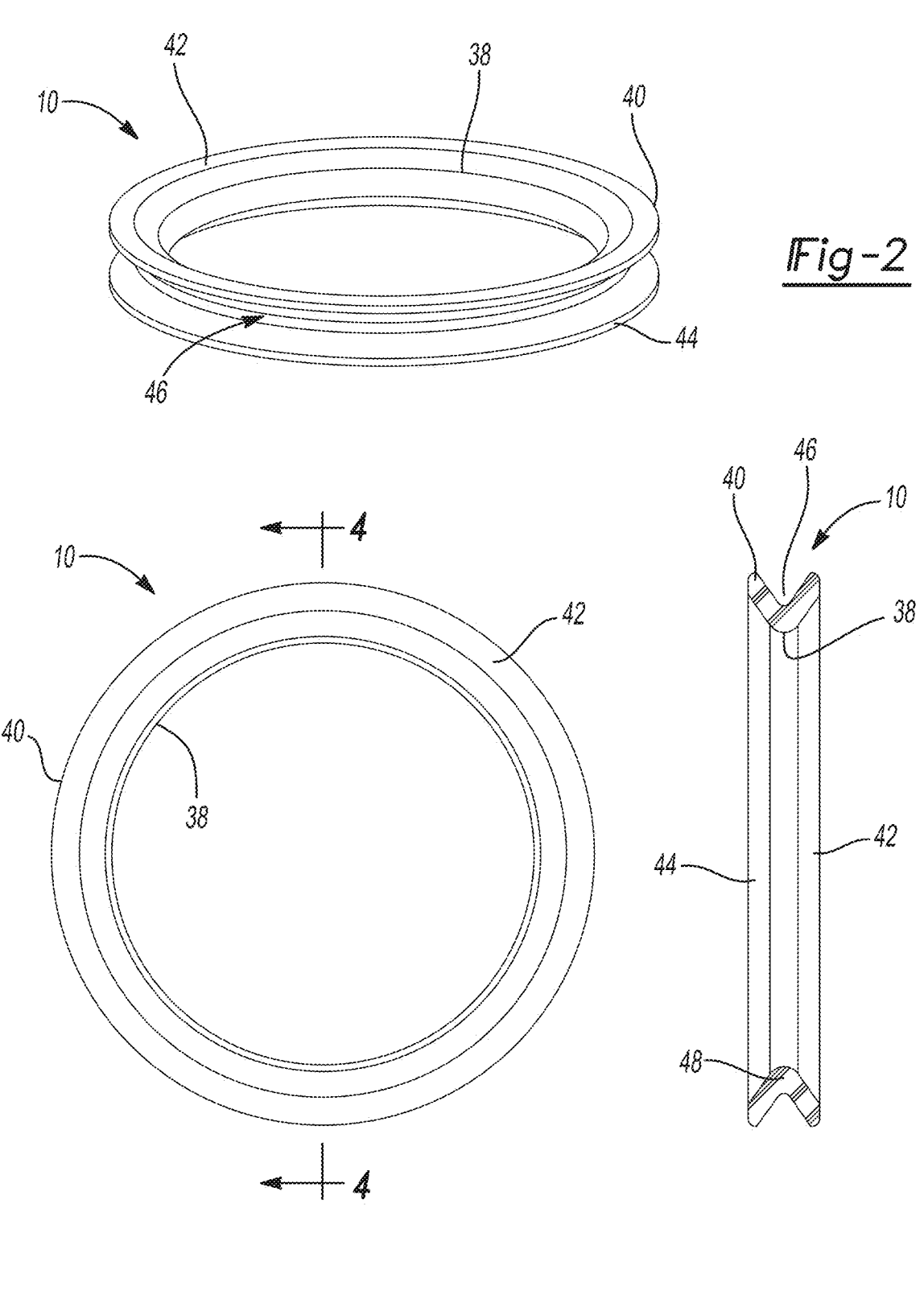
FIG. 2 is a perspective view depicting an implementation of the spacer.
FIG. 3 is a top view of an implementation of a spacer.
FIG. 4 is a cross-sectional view along section line A-A of the spacer depicted in FIG. 3.

As shown in the implementation depicted by FIGS. 2-4, the spacer 10 has an inner diameter 38 configured to receive and abut the output shaft 22 and an outer diameter 40. A first wall 42 extends between the inner diameter 38 and the outer diameter 40 and is configured to abut a radial surface of the first output shaft bearing 30. At the outer diameter 40, the first wall 42 is configured to abut both the radial surface of the first output shaft bearing 30 and an interior surface of the housing 14. A second wall 44 extends between the inner diameter 38 and outer diameter 40 of the spacer 10 on a radially opposite side of the spacer 10, meeting the first wall 42 at the inner diameter 38. The first wall 42 and the second wall 44 extend radially outwardly away from the inner diameter 38 at an angle relative to each other. The second wall 42 is configured to abut either the housing 14 or another component or components that eventually contact a portion of the housing 14. In the implementation shown in FIG. 1, the second wall 44 abuts the output shaft seal 26 which is in contact with a portion of the housing 14 such that an axial force can be transmitted through the output shaft seal 26 and the spacer 10 to the bottom radial surface of the first output shaft bearing 30. The contact between the spacer 10 and the housing 14, the spacer 10 and the radial surface of the first output shaft bearing 30, or the spacer 10 and the output shaft seal 26 can create a seal between the spacer 10 and the housing 14, the spacer 10 and the radial surface of the first output shaft bearing 30, or the spacer 10 and the output shaft seal 26 such that lubrication cannot escape the rotating electrical machine 12 and containments cannot enter the rotating electrical machine 12. The spacer may have a circumferential groove 46 extending radially inward between the first wall 42 and the second wall 44 originating from the outer diameter 40. The circumferential groove 46 creates a V-shaped cross-section 48 throughout the spacer 10; however, the specific dimensions of the V-shaped cross-section 48 can be altered to tune the stiffness and/or dampening properties of the spacer 10. However, in some implementations, the spacer can be configures such that an inner diameter of the spacer does not receive and/or abut the output shaft.

Figures 5, 6:
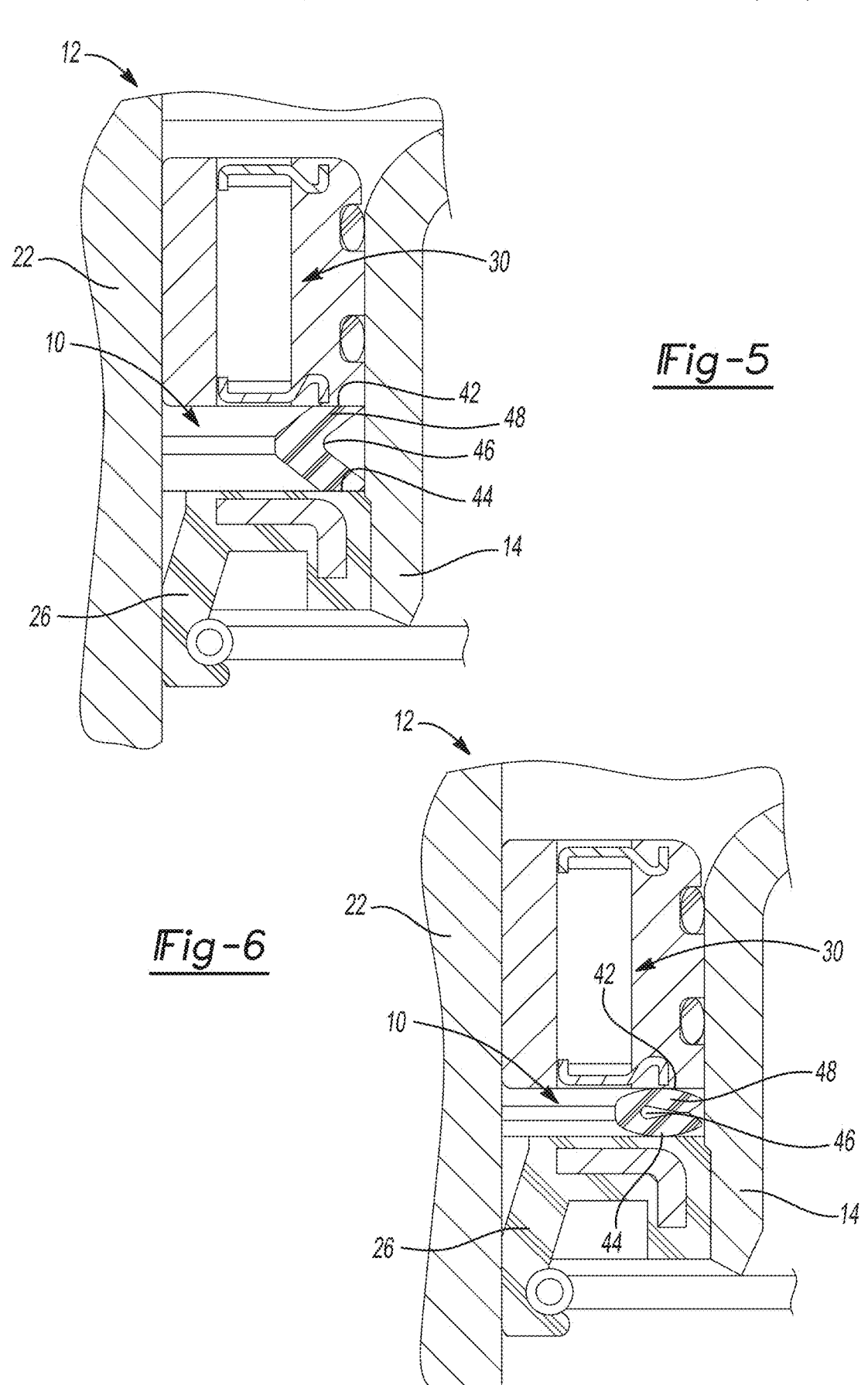
FIG. 5 is a cross-sectional view depicting a portion of the rotating electrical machine having an implementation of a spacer configured to be received by an output shaft and abut an output shaft bearing.
FIG. 6 is a cross-sectional view depicting a portion of the rotating electrical machine having an implementation of a spacer configured to be received by an output shaft and abut an output shaft bearing where the spacer is subject to a load.

FIG. 5 shows an implementation of a rotating electrical machine 12 where the first wall 42 of the spacer 10 abuts the first output shaft bearing 30 and the second wall 44 abuts the output shaft seal 26 that abuts the housing 14. In this instance, the spacer 10 is under light axial load such that the spacer 10 is contacting both the first output shaft bearing 30 and the output shaft seal 26, but the first wall 42 and the second wall 44 are spaced apart at the outer diameter 40 such that the spacer 10 has room to further compress should the axial force increase. In FIG. 6, the spacer 10 is shown to be under increased axial load, such that the V-shaped cross-section 48 is deformed due to the axial force between the first output shaft bearing 30 and the output shaft seal 26. In this instance, the distance between the first wall 42 and the second wall 44 is decreased. During operation of the rotating electrical machine 12, it is expected that the spacer 10 will be deformed by an amount somewhere between the two extremes of compression shown by FIG. 6 and expansion shown by FIG. 5. Therefore, constructing the spacer 10 of an elastomer material allows the spacer 10 to reliably undergo numerous cycles between light axial loads and increased axial loads as often experienced by the spacer 10 due to vibrations of the rotating electrical machine 12 itself or the rotating electrical machine's 12 environment.

FIG. 7 shows another implementation of the spacer 10 wherein a supplementary material 50 is inserted into the circumferential groove 46 circumferentially surrounding the spacer 10 between the first wall 42 and the second wall 44. In the implementation pictured in FIG. 7, the supplementary material 50 has a triangular cross-section 52 and fills the entire circumferential groove 46 such that the supplementary material 50 abuts the housing 14. However, in other implementations, the supplementary material 50 may vary in size, shape and material composition to tune the dampening and stiffness of the spacer 10 in combination with the supplementary material 50 for the intended implementation.

In some implementations, the spacer 10 and the output shaft seal 26 can be combined into a single component 54. FIG. 8 shows the spacer 10 abutting the first output shaft bearing 30 at the first wall 42 and the output shaft seal 26 extending out from the second wall 44 towards the housing 14 and towards the output shaft 22. Combining the spacer 10 and the output shaft seal 26 into a single component 54 can reduce the complexity of the rotating electrical machine 12 by reducing the total number of components while simultaneously decreasing manufacturing costs.

Figure 9:
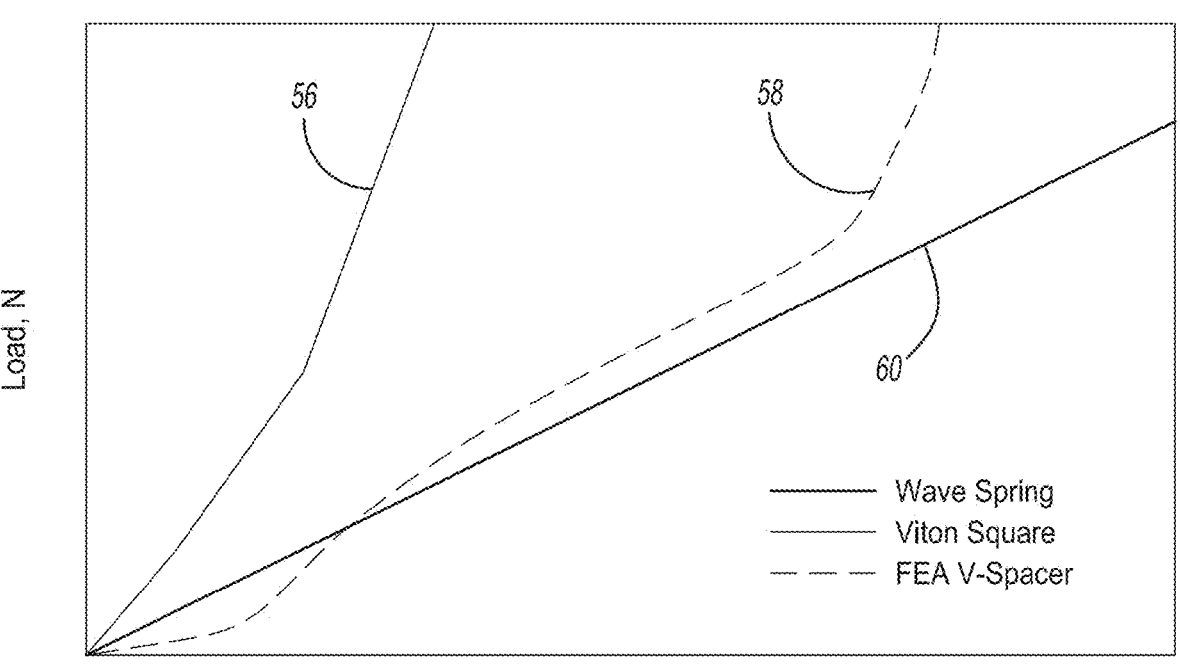
FIG. 9 is a graph depicting the compression-load performance of the spacer compared to a wave spring and a square cross-sectioned spacer.

FIG. 9 is a schematic showing the relationship between load and compression on various types of spacers. Using a spacer with a square cross-section 56 proved to be stiffer than ideal whereas the spacer 10 having a V-shaped cross-section 48, 58 was able to mimic the performance of a metallic wave spring 60 for a substantial portion of compression. The spacer 10 with a V-shaped cross-section 48, 58 also handled larger peak loads than the metallic wave spring 60, reducing the likelihood of failure.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A spacer assembly for a rotating electrical machine, comprising:
   an output shaft at least partially within a housing of the rotating electrical machine;
   an output shaft bearing received by an outer diameter of the output shaft; and
   a spacer having:
   an inner diameter and an outer diameter;

a first wall, extending from the inner diameter to the outer diameter, abutting a radial surface of the output shaft bearing; and
   a second wall, attached to the first wall at the inner diameter, extending from the inner diameter to the outer diameter, abutting a surface of a housing of the rotating electrical machine,
   wherein the first wall and the second wall are axially spaced apart at the outer diameter and the spacer is axially compressed between the output shaft bearing and the housing to load the output shaft bearing and direct axial force against the output shaft bearing through the first wall and the output shaft seal through the second wall.

2. The spacer of claim 1, wherein the spacer has a V-shaped cross-section.

3. The spacer of claim 1, wherein the inner diameter is configured to receive the output shaft.

4. The spacer of claim 2, wherein the spacer further comprises a circumferential groove extending radially inwardly between the first wall and the second wall originating from the outer diameter.

5. The spacer of claim 4, wherein contact between the spacer and the housing creates a seal between the spacer and the housing.

6. The spacer of claim 4, wherein contact between the spacer and the radial surface of the output shaft bearing creates a seal between the spacer and the radial surface of the output shaft bearing.

7. The spacer of claim 4, wherein contact between the spacer and the output shaft seal creates a seal between the spacer and the output shaft seal.

8. The spacer of claim 4, further comprising supplementary material positioned within the groove and between the first wall and the second wall.

9. The spacer of claim 4, wherein the spacer and the output shaft seal are formed to be a single component.

10. A spacer assembly for a rotating electrical machine, comprising:
   an output shaft at least partially within a housing of the rotating electrical machine;
   an output shaft bearing received by an outer diameter of the output shaft; and
   a spacer having:
   an inner diameter, configured to receive the output shaft, and an outer diameter;
   an output shaft seal received within a housing of the rotating electrical machine;
   a first wall, extending from the inner diameter to the outer diameter, abutting a radial surface of the output shaft bearing as well as a surface of the housing; and
   a second wall, attached to the first wall at the inner diameter, extending from the inner diameter to the outer diameter, abutting a surface of the output shaft seal,
   wherein the first wall and the second wall are axially spaced apart at the outer diameter and the spacer is axially compressed between the output shaft bearing and the housing.

11. The spacer of claim 10, wherein the spacer further comprises a circumferential groove extending radially inward between the first wall and the second wall originating from the outer diameter and the spacer is made of an elastomer material.

* * * * *